United States Patent
Eckl et al.

(10) Patent No.: US 9,559,394 B2
(45) Date of Patent: Jan. 31, 2017

(54) ENERGY STORAGE DEVICE

(71) Applicant: Technische Universitat Munchen, Munich (DE)

(72) Inventors: Richard Eckl, Munich (DE); Georg Walder, St. Martin/Gsies (IT); Moritz Steffan, Rosenheim (DE); Martin R. Hammer, Munich (DE); Peter Burda, Munich (DE)

(73) Assignee: Technische Universitat Munchen, Muenche (DE)

( * ) Notice: Subject to any disclaimer, the term of this patent is extended or adjusted under 35 U.S.C. 154(b) by 0 days.

(21) Appl. No.: 14/417,157

(22) PCT Filed: Jul. 25, 2013

(86) PCT No.: PCT/EP2013/065765
§ 371 (c)(1),
(2) Date: Jan. 25, 2015

(87) PCT Pub. No.: WO2014/016393
PCT Pub. Date: Jan. 30, 2014

(65) Prior Publication Data
US 2015/0180098 A1 Jun. 25, 2015

(30) Foreign Application Priority Data
Jul. 27, 2012 (DE) ........................ 10 2012 213 273

(51) Int. Cl.
*H01M 10/6553* (2014.01)
*H01M 10/655* (2014.01)
(Continued)

(52) U.S. Cl.
CPC ....... *H01M 10/6553* (2015.04); *H01M 2/1077* (2013.01); *H01M 2/206* (2013.01);
(Continued)

(58) Field of Classification Search
None
See application file for complete search history.

(56) References Cited

U.S. PATENT DOCUMENTS

2010/0104935 A1* 4/2010 Hermann ............ H01M 10/613
429/120
2011/0177373 A1 7/2011 Pellene
2011/0244310 A1 10/2011 Kim
2012/0188714 A1* 7/2012 Von Borck .......... H01M 2/1061
361/688

FOREIGN PATENT DOCUMENTS

CN 102376931 A 3/2012
DE WO 2010/031856 * 3/2010 .............. H01M 2/20
(Continued)

OTHER PUBLICATIONS

European Search Report corresponding to international application No. PCT/EP2013/065765, mailed Oct. 10, 2013 (6 pages).

*Primary Examiner* — Yoshitoshi Takeuchi
(74) *Attorney, Agent, or Firm* — Maginot, Moore & Beck, LLP

(57) ABSTRACT

Device for contacting electrical energy storage cells of an energy store, which are each connected at their poles to a printed circuit board via an electrically and thermally conductive contact element, said printed circuit board being provided to separate an electrical current, received by the respective energy storage cell via the contact element, from a heat flow received via the contact element.

14 Claims, 6 Drawing Sheets

(51) Int. Cl.
*H01M 2/10* (2006.01)
*H01M 2/20* (2006.01)
*H01M 10/625* (2014.01)
*H01M 10/653* (2014.01)
*H01M 10/6554* (2014.01)
*H01M 10/613* (2014.01)
*H01M 10/42* (2006.01)
*H01M 10/48* (2006.01)

(52) U.S. Cl.
CPC ..... *H01M 10/5051* (2013.01); *H01M 10/613* (2015.04); *H01M 10/625* (2015.04); *H01M 10/653* (2015.04); *H01M 10/6554* (2015.04); *H01M 10/425* (2013.01); *H01M 10/482* (2013.01); *H01M 10/486* (2013.01); *H01M 2010/4271* (2013.01); *H01M 2200/103* (2013.01); *H01M 2200/106* (2013.01); *H01M 2220/20* (2013.01)

(56) References Cited

FOREIGN PATENT DOCUMENTS

| | | | |
|---|---|---|---|
| DE | 10 2009 018 787 A1 | 10/2010 | |
| DE | 10 2009 018787 | * 10/2010 | ............. H01M 2/20 |
| DE | 10 2009 035 458 A1 | 2/2011 | |
| DE | 102009035465 A1 | 2/2011 | |
| DE | 102010046992 A1 | 9/2011 | |
| DE | 102010039979 A1 | 3/2012 | |
| JP | H02271558 A | 11/1990 | |
| JP | 2007097350 A | 4/2007 | |
| JP | 2008079440 A | 4/2008 | |
| JP | 2012044768 A | 3/2012 | |
| JP | 2013242621 A | 12/2013 | |
| WO | 2010031856 A2 | 3/2010 | |
| WO | 2014016393 A1 | 1/2014 | |

* cited by examiner

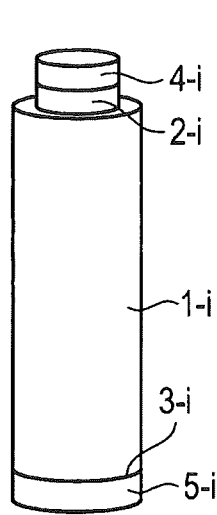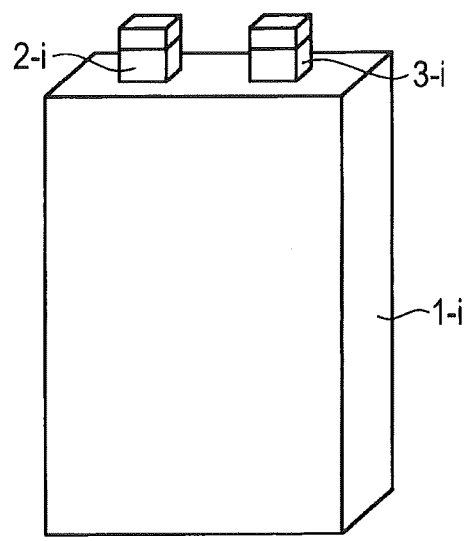
Fig. 7A
Fig. 7B
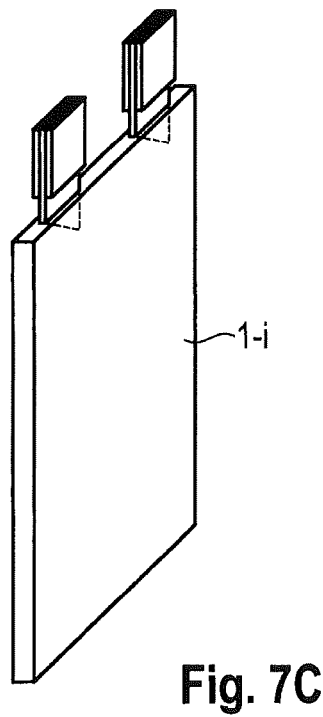
Fig. 7C

ENERGY STORAGE DEVICE

The invention relates to an energy storage device for a vehicle, and in particular to a device for contacting and cooling electrical energy storage cells of the energy store.

In many applications, it is required to store electrical energy. In particular in vehicles having an electric drive or electric motor, it is required to provide sufficient electrical charge and to store said charge in an energy store of the vehicle.

FIG. 1 shows a conventional energy store as used, for example, in electric road vehicles. In the conventional energy store illustrated in FIG. 1, or battery pack for automobiles, round, pouch-like or prismatic battery cells are used which have electrical poles on the upper or lower side. The electrical connection beneath the individual battery or energy storage cells is produced predominately by resistance welding. In this respect, a pole P of the energy storage cells ESZ is connected by spot welding for example to a so-called Hilumin strip HB by means of several welding spots SP in each case. The Hilumin strip HB consists of Hilumin, i.e., nickel-plated steel, and has a higher electrical resistance than the housing parts of the battery storage cells which are welded. The higher electrical resistance of the Hilumin strip HB is necessary in order for a welding current to flow from the Hilumin strip to the battery housing of the respective energy storage cell and then back to the Hilumin strip HB and not to be directly discharged via the Hilumin strip HB.

In the conventional energy storage device, as illustrated in FIG. 1, a heat flow $Q^\cdot$ generated in each case from the energy storage cells ESZ is discharged via the peripheral surface thereof. The energy storage cells ESZ can be cooled, for example, via air or liquid cooling. The welded battery pack or the welded energy storage cells are enclosed in a non-electrically conductive housing G of the energy storage device. The electrical current I, which flows from the energy storage cells, is diverted via the poles P of the energy storage cell ESZ and the welding spots SP to the Hilumin strip HB of the energy storage device.

The Hilumin strip HB of the conventional energy storage device has a higher electrical resistance than is otherwise typical in electrical conductors and thus increases the overall internal resistance of the conventional energy store illustrated in FIG. 1. Furthermore, in the conventional energy store of FIG. 1, a welding process is required on both sides of an energy storage cell ESZ in order to contact the energy storage cells with the Hilumin strip HB. The conventional energy storage device, as illustrated in FIG. 1, requires a multiplicity of welding processes during production owing to the multiplicity of energy storage cells ESZ integrated therein in order to produce the contacting for the multiplicity of energy storage cells. Therefore, the welding process for the contacting of a complete battery pack having a multiplicity of energy storage cells ESZ is extremely time-consuming. Furthermore, ensuring a constant quality of the weld connections is technically complex. In addition, the cell can be damaged during the welding process owing to the penetration of heat into the cell.

Furthermore, the conventional energy storage device, as illustrated in FIG. 1, is disadvantageous in that cooling of the energy storage cells ESZ occurs exclusively via the peripheral surfaces of the respective energy storage cells ESZ. As a result, although the energy storage cell ESZ can be cooled from the outside, a certain temperature gradient forms towards the interior of the energy storage cell, i.e. the temperature in an energy storage cell ESZ drops towards the outside, starting from the centre of the energy storage cell ESZ. This temperature gradient within an energy storage cell results in uneven ageing of the battery or energy storage cell ESZ. It is not possible to cool the interior of the energy storage cell in the conventional arrangement as per FIG. 1 since cooling cannot be effected via the welding contacts. Although electrical energy can be dissipated via the welding points, the heat flow which can be dissipated via the welding spots SP is extremely low towards the outer edge of the housing G.

It is thus an object of the present invention to provide a device for contacting electrical storage cells which obviates the disadvantages of the conventional arrangement such as, for example, damage to the cell owing to the heat penetration during the welding process, and provides more effective cooling of the energy storage cells of an energy store. Furthermore, the volumic energy of the energy store can be increased since the packing density of the energy storage cells can be increased.

This object is achieved in accordance with the invention by a device having the features described in claim 1.

Accordingly, the invention provides a device for contacting electrical energy storage cells which are each connected at their poles to a printed circuit board via an electrically and thermally conductive contact element, said printed circuit board being provided to separate an electrical current, received by the respective energy storage cell via the contact element, from a heat flow received via the contact element.

The device in accordance with the invention thus offers the advantage that the heat produced in the energy storage cells is not only dissipated through the peripheral surfaces of the energy storage cells but additionally over a large area via the thermally conductive contact elements.

Owing to the additional, central dissipation of heat from the centre of the electrical energy storage cell to the poles thereof, a temperature gradient within the energy storage cell is additionally minimised. Uneven ageing of energy storage cells within the energy store is hereby prevented.

In one possible embodiment of the device in accordance with the invention, provided on both poles of the electrical energy storage cell on the end side are in each case flat contact elements consisting of a flexible material between the respective pole of the electrical energy storage cell and the respective printed circuit board.

In a further possible embodiment of the device in accordance with the invention, the flat contact elements are fixedly connected to the electrical energy storage cell or the printed circuit board. This can occur, e.g., by means of a screen printing method.

In a further possible embodiment of the device in accordance with the invention, the flat contact elements are first produced within the completely assembled battery pack, in that prior to assembly a pasty, hardening mass is introduced into the intermediate space between an electrical energy storage cell and printed circuit board.

Owing to the large surface area and low material thickness of the thermally conductive contact elements and the low thermal resistance of the material of the contact element, the thermal resistance of the respective flat contact elements is low which means that heat is efficiently diverted to a large extent from the electrical energy storage cells and the energy storage cells are thus cooled more effectively. Since the contact elements are additionally produced from a flexible material, they also provide an effective electrical and vibration-resistant connection or contacting. The surface area of the contact elements is relatively large compared with the size of the energy storage cell, whereby effective heat dissipation is promoted.

In one possible embodiment of the device in accordance with the invention, the electrical energy storage cells are mounted at their poles in each case with a particular contact force between two printed circuit boards. As a result, an electrical and thermal contact can be ensured. Furthermore, assembly is advantageously simplified by clamping the electrical energy storage cells of the energy store between the printed circuit boards.

In one possible embodiment of the device in accordance with the invention, the printed circuit board comprises in each case an electrically conductive and heat-conducting first layer which lies against the contact element of the respective energy storage cell, wherein the first layer of the printed circuit board laterally discharges the electrical current flowing via the contact element and transfers the heat flow flowing via the contact element to a second heat-conducting layer of the printed circuit board.

In one possible embodiment of the device in accordance with the invention, the second heat-conducting or thermally conductive layer of the printed circuit board discharges the heat flow received by the first layer of the printed circuit board to a surrounding area of the energy storage cell.

In a further possible embodiment, the second thermally conductive layer of the printed circuit board outputs the heat flow received by the first layer of the printed circuit board to a cooling medium.

By laterally discharging the electrical current supplied by the energy storage cells, the electrical charge supplied by the energy storage cells can be simply diverted from the energy store via laterally mounted electrical contacts.

In a further possible embodiment of the device in accordance with the invention, the second layer of the printed circuit board is electrically conductive and is separated from the electrically conductive first layer of the printed circuit board by an electrically insulating intermediate layer of the printed circuit board.

In one possible embodiment of the device in accordance with the invention, the electrically insulating intermediate layer of the printed circuit board consists of a thermally conductive material having a low material thickness compared with the remaining layers of the printed circuit boards.

In a further possible embodiment of the device in accordance with the invention, electrical safety elements for overload protection are provided in the electrically and thermally conductive first layer of the printed circuit board.

In one possible embodiment of the device in accordance with the invention, the printed circuit board is simultaneously used as a structural element or external wall of the housing.

In one possible embodiment of the device in accordance with the invention, the electrical energy store comprises a plurality of energy storage cells which are connected in parallel in an energy storage cell group. The capacity of the electrical energy store can be increased hereby.

In one possible embodiment of the device in accordance with the invention, a plurality of energy storage cell groups which each comprise energy storage cells connected in parallel are series-connected in the energy store. As a result, the voltage provided by the electrical energy store can be increased.

In one possible embodiment of the device in accordance with the invention, the series-connected energy storage cell groups of the energy store are connected to an electronic monitoring unit in each case via sense lines which are provided in the printed circuit board, which monitoring unit monitors an electrical voltage applied in each case at the energy storage cell groups of the energy store.

Owing to the progression of the sense line in the printed circuit board, which also conducts the active current, contacting of the sensor lines at the energy storage cells can be considerably simplified without having to guide additional cables to the electronic monitoring unit for this purpose. The sense lines can be simply included in the printed circuit board layout. The consequence of this is that separate contacting of the sensor lines is not required and thus cabling complexity and manufacturing costs are significantly reduced.

The same is also true for the sensor lines such as, for example, sensor lines for temperature sensors.

In one possible embodiment of the device in accordance with the invention, an electrical safety element for overload protection is provided in or on the first layer of the printed circuit board for each energy storage cell group or for each individual energy storage cell of an energy storage cell group. As a result, a defective energy storage cell can be rapidly and reliably switched off using an associated electrical safety element, whereby further hazardous processes within a storage cell, which can ultimately result in the cell catching fire, are reliably prevented.

In addition, by individually protecting each energy storage cell, in the event of a malfunction of an individual cell or malfunctions of one or more cells of a possible parallel composite, the energy extraction is further enabled and the functional capability of the energy storage composite is maintained.

In a further possible embodiment of the device in accordance with the invention, the heat output by an energy storage cell or by an energy storage cell group of the energy store is detected by at least one associated temperature sensor which is provided on the printed circuit board and signals the detected temperature to the electronic monitoring unit of the energy store. As a result, it is no longer required to accommodate temperature sensors within the storage cell module. In addition, the temperature sensors can be included in the contacting printed circuit board layout and provided directly thereon. As a result, the manufacturing costs of the energy store are additionally reduced.

In a further possible embodiment of the device in accordance with the invention, compensation resistors are provided for converting excess charge from energy storage cells of the energy store into heat, wherein the heat produced by the compensation resistors is output to the printed circuit board via the electrically and thermally conductive contact element. By directly diverting the heat to the thermally conductive contact element, a balancing output of the energy store can be considerably increased and consequently has no influence on the load dynamics of the energy store.

In a further possible embodiment of the device in accordance with the invention, the heat output by the compensation resistors is uniformly distributed via the printed circuit board, consisting of thermally conductive layers, in order to pre-heat the energy store, in particular in the case of low ambient temperatures. This has the advantage that no dedicated heat conduction has to be provided by way of a heat source in order to pre-heat the energy store.

The invention further provides an energy storage device for a vehicle having the features described in claim 15.

Accordingly, the invention provides an energy storage device for a vehicle having an energy store which comprises a plurality of series-connected energy storage cell groups which consist of energy storage cells connected in parallel, wherein the poles of an energy storage cell are connected to a printed circuit board in each case via an electrically and thermally conductive contact element, said printed circuit board being provided to separate an electrical current, received by the respective energy storage cell via the contact element, from a heat flow received via the contact element.

Possible embodiments of the device in accordance with the invention will be explained in more detail hereinafter with reference to the accompanying figures, in which:

FIGS. 7A, 7B, 7C show exemplified embodiments of energy storage cells of the energy storage device in accordance with the invention.

Figure 1:
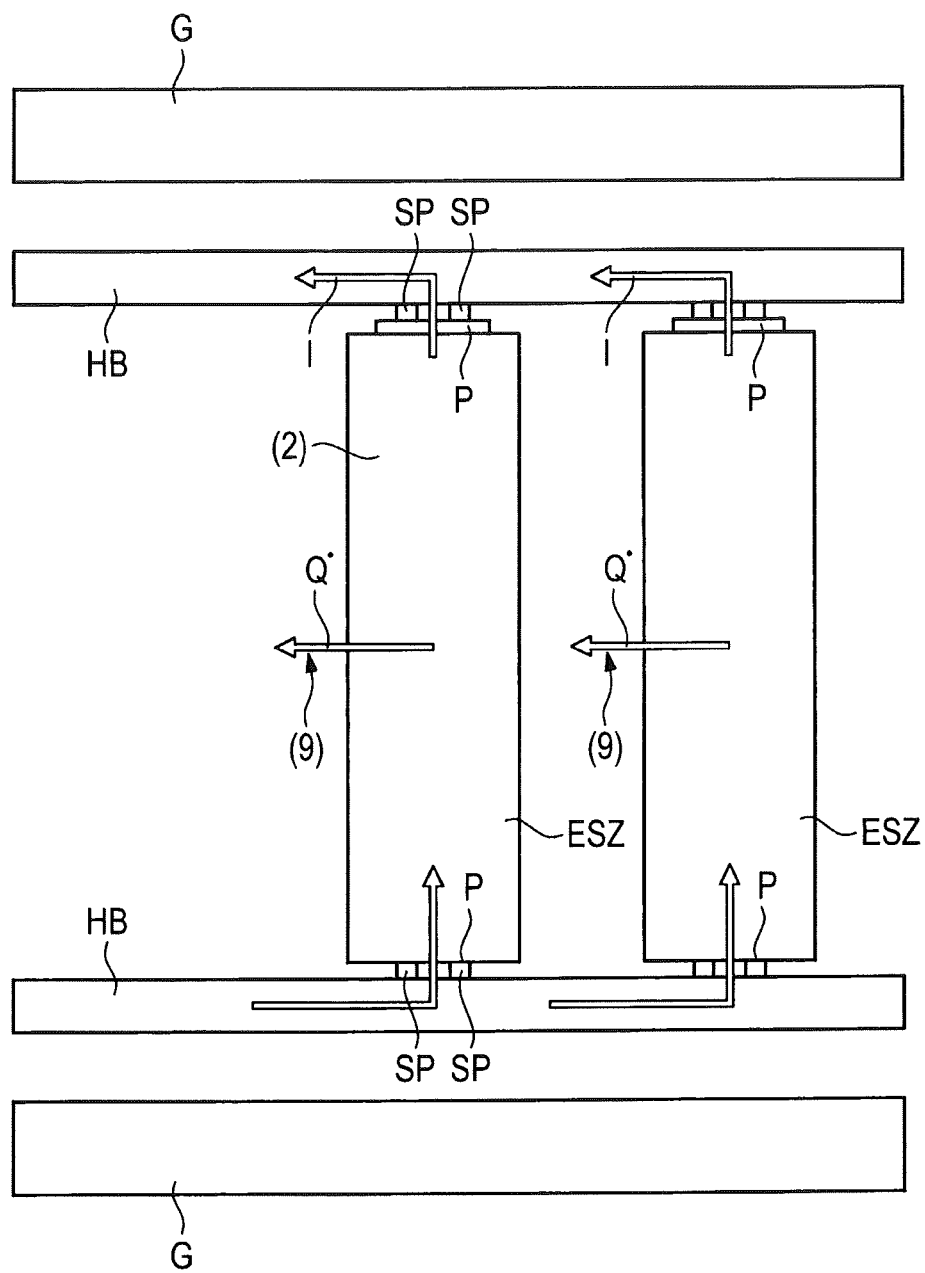
FIG. 1 shows a conventional arrangement of energy storage cells.
Figure 2:
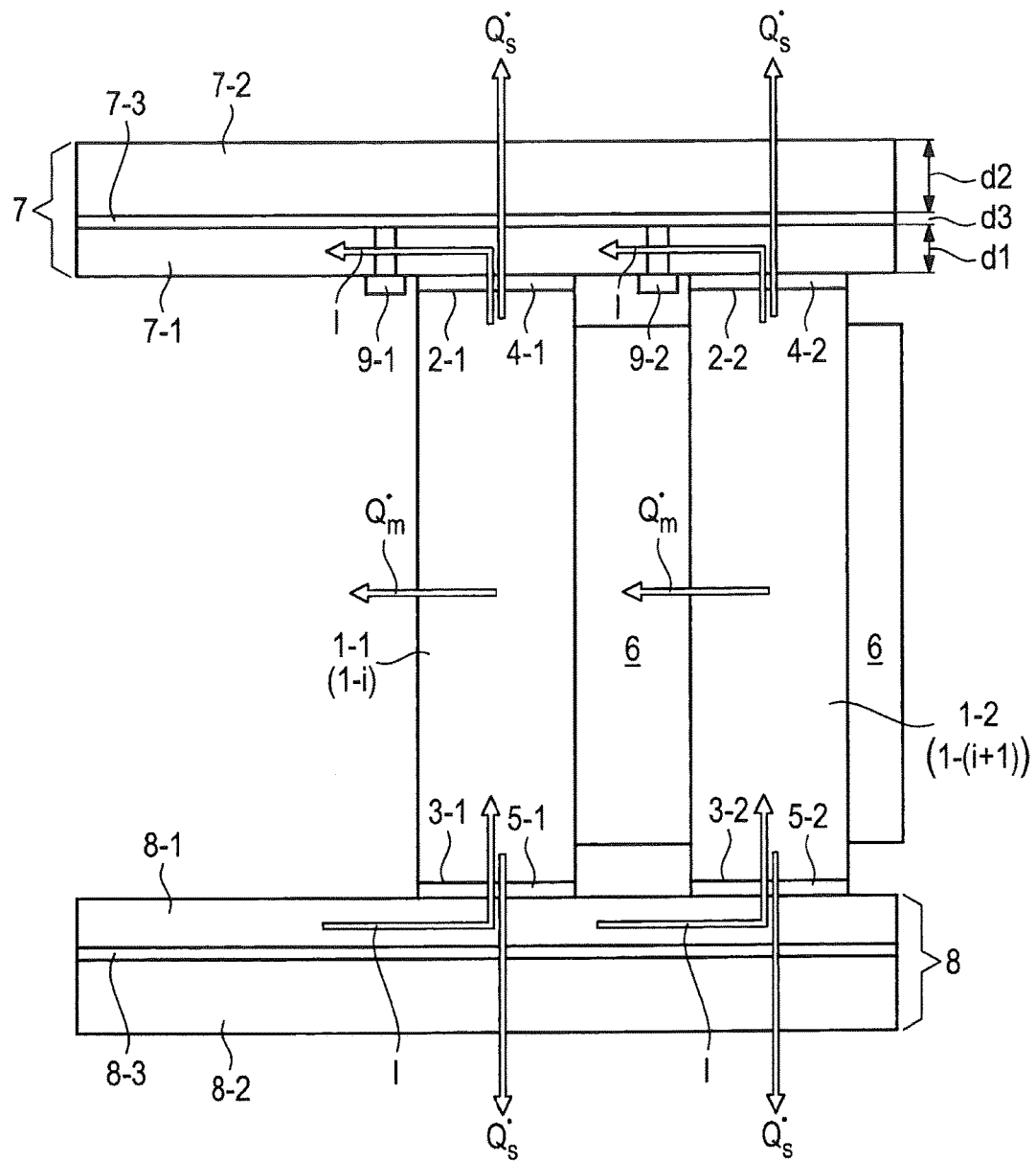
FIG. 2 shows an arrangement of energy storage cells within an energy store to illustrate an exemplified embodiment of the device in accordance with the invention.

As can be seen from FIG. 2, the device 1 in accordance with the invention comprises, in the exemplified embodiment illustrated in FIG. 2, electrical energy storage cells 1-1, 1-2, wherein the energy storage cells 1-1, 1-2 each have two electrical poles 2, 3. For instance, the first electrical energy storage cell 1-1 comprises a first or positive electrical pole 2-1 and a second or negative electrical pole 3-1. In an identical fashion, the second energy storage cell 1-2 has a first positive pol 2-2 and a negative electrical pole 3-2. Provided on each of the two positive poles 2-1, 2-2 of the electrical energy storage cells 1-1, 1-2 is a contact element 4-1, 4-2, as illustrated in FIG. 2. Likewise, a contact element 5-1, 5-2 is provided on the two negative poles 3-1, 3-2, as illustrated in FIG. 2. The contact elements 4-1, 4-2, 5-1, 5-2 form connecting elements which comprise an elastic contacting material which is electrically and thermally conductive and draws its elastic deformation from the change in a longitudinal extension in a direction perpendicular to the contact surfaces of the battery poles of the energy storage cells 1-1, 1-2. The surface of a battery pole is completely or partially covered by the elastic contacting material and is hereby protected from being contacted by moisture. The contact elements or connecting elements can be adhered or attached in another manner. In one possible embodiment, the elastic contacting material of the contact elements 4-1, 4-2, 5-1, 5-2 consists of a mixture of elastomer and metal particles. In one possible embodiment variant, the metal particles have a surface coating. This surface coating can be electroplated or non-electroplated. The energy storage cells 1-1, 1-2 consist of battery cells in one possible embodiment. Furthermore, the energy storage cells 1-1, 1-2 can also be chargeable battery cells. The energy storage cells 1-$i$ can also be physical energy stores, in particular capacitors. In one possible embodiment, the energy storage cells 1-1, 1-2 are configured cylindrically and each have a peripheral surface (FIG. 7A shows a cylindrically configured energy storage cell 1-$i$). The energy storage cells 1-1, 1-2 can be used, as illustrated in FIG. 2, in a support structure 6 which consists, for example, of an electrically insulating synthetic material. In a preferred embodiment, the material of the support structure 6 is thermally conductive which means that the heat present at the peripheral surfaces of the energy storage cells 1-1, 1-2 can be discharged via the support structure 6 as heat flow $Q_m^{\bullet}$. In order to optimise the heat output via the peripheral surface, the support structure can carry a cooling medium (air, water, etc.). In one possible embodiment, the support structure 6 comprises cylindrical recesses, into which cylindrically configured energy storage cells 1-$i$ can be inserted in a custom-fit manner. The inserted energy storage cells 1-1, 1-2 are preferably inserted into the support structure 6 in a replaceable manner. The upper and lower contact elements 4-1, 4-2 and 5-1, 5-2 are provided at the end surfaces of the energy storage cells 1-1, 1-2 which simultaneously form the poles of the energy storage cells. These contact elements are electrically conductive and also thermally conductive. In the case of the exemplified embodiment illustrated in FIG. 2, the energy storage cells 1-1, 1-2 are connected, in an electrically and thermally conductive manner, to a first printed circuit board 7 via the upper contact elements 4-1, 4-2 and to a lower printed circuit board 8 via the lower contact elements 5-1, 5-2. The printed circuit boards 7, 8 are each used to separate the electrical current I, received by the energy storage cells 1-$i$ via the contact elements, from a heat flow $Q_s^{\bullet}$ received via the contact elements. As can be seen in FIG. 2, a second heat flow $Q_s^{\bullet}$ flows starting from the end sides of the electrical storage cells 1-$i$ in each case via the thermally conductive contact elements 4, 5 of the upper and lower printed circuit boards 7, 8. The printed circuit boards 7, 8 are configured such that they separate an electrical current I, received by an energy storage cell via a contact element, from a heat flow $Q_s^{\bullet}$ received via the contact element.

In order to separate the end-side heat flow $Q_s^{\bullet}$ from the electrical current I, the two printed circuit boards 7, 8 are constructed from different layers in the illustrated exemplified embodiment. This means that the upper printed circuit board 7 comprises a heat-conducting and electrically conductive first layer 7-1 which lies directly against the upper contact elements 4-1, 4-2. This first electrically conductive layer 7-1 laterally discharges the electrical current I flowing via the contact elements 4-1, 4-2, as illustrated in FIG. 2. Furthermore, the electrically conductive and thermally conductive layer 7-1 transfers the heat flow $Q_s^{\bullet}$ flowing in each case via the contact elements 4-1, 4-2 to a second heat-conducting layer 7-2 of the printed circuit board 7. The second thermally conductive layer 7-2 of the printed circuit board 7 outputs the heat flow $Q_s^{\bullet}$ received by the first layer 7-1 to a surrounding area or to a cooling medium, as illustrated in FIG. 2. In the case of the exemplified embodiment illustrated in FIG. 2, an electrically insulating intermediate layer 7-3 is located between the first thermally and electrically conductive layer 7-1 and the second thermally conductive layer 7-2 of the printed circuit board 7, which intermediate layer is required if the second thermally conductive layer 7-2 is electrically conductive. The thickness d1 of the first electrically and thermally conductive layer 7-1 can be in a range of, for example, 20 to 500 μm. The thickness d2 of the second at least thermally conductive layer 7-2 can be, for example, in a range of e.g. 1 to 5 mm, i.e., the second thermally conductive layer 7-2 of the printed circuit board 7 is, in a preferred embodiment, thicker than the first electrically and thermally conductive layer 7-1 of the first printed circuit board 7. The intermediate layer 7-3 lying therebetween has a thickness d3 which, in a preferred embodiment, is relatively thin, and wherein the thickness d3 is less than the thickness d1 and the thickness d2 of the two remaining layers 7-1, 7-2 of the printed circuit board 7. The intermediate layer 7-3 consists of an electrically insulating material which is also thermally conductive which means that the heat flow $Q^{\bullet}_s$ can flow therethrough, as illustrated in FIG. 2. In one possible embodiment, the intermediate layer 7-3 has a thermal conductivity of at least 0.1 W/(K·m).

As illustrated in FIG. 2, the lower printed circuit board 8 can be constructed in an identical manner to the upper printed circuit board 7. In that way, the first thermally and electrically conductive layer 8-1 corresponds to the first layer 7-1 of the upper printed circuit board 7. The second thermally conductive layer 8-2 of the lower printed circuit board 8 corresponds to layer 7-2 of the upper printed circuit board 7. The electrically insulating and simultaneously thermally conductive intermediate layer 8-3 of the lower printed circuit board 8 corresponds to the intermediate layer 7-3 of the upper printed circuit board 7.

In the exemplified embodiment illustrated in FIG. 2, the two printed circuit boards 7, 8 are each constructed from three layers. In an alternative embodiment, the two printed circuit boards 7, 8 each comprise only two layers, namely an electrically and thermally conductive layer 7-1 and a second electrically insulating, thermally conductive layer 7-2 or 8-2. This embodiment has the advantage that there is no need to provide an intermediate layer, in particular the intermediate layers 7-3, 8-3 illustrated in FIG. 2. In contrast, the embodiment illustrated in FIG. 2 offers the advantage that the first and second layer of the two printed circuit boards can each be produced from an electrically and thermally conductive material which are separated from each other by an electrically insulating layer 7-3 or 8-3. Since electrically conductive materials are generally simultaneously extremely effective thermal conductors, the heat flow $Q^{\bullet}_s$ can be more effectively output from the cell to the surrounding area compared with the two-layer embodiment.

In one possible embodiment, the electrically conductive and thermally conductive material, which is used in particular in the electrically conductive and thermally conductive layer 7-1 or 8-1 of the two printed circuit boards 7, 8, can be a metal and in particular copper, silver or gold. The two layers 7-2, 8-2 of the two printed circuit boards 7, 8 can consist, for example, of an electrically conductive and thermally conductive material, preferably a metal, for example aluminium, or a thermally conductive, electrically insulating material, for example a synthetic material. If the two layers 7-2, 8-2 of the two printed circuit boards 7, 8 consist of an electrically conductive and thermally conductive material, then an electrically insulating intermediate layer 7-3, 8-3 is additionally required, which intermediate layer can consist, for example, of a synthetic material, for example epoxide resin, or a ceramic material, for example aluminium oxide. The contact elements 4-1, 4-2 or 5-1, 5-2 consist, for example, of a conductive elastomer, in particular silicone. The three layers 7-1, 7-2, 7-3 of the first printed circuit board 7 and all three layers 8-1, 8-2 and 8-3 of the second printed circuit board 8 consist of a thermally conductive material having a conductivity of preferably more than 10 W/(K·m). In one possible embodiment, the energy storage cells 1-$i$ and the flexible contact elements 4, 5 thereof are clamped between the two printed circuit boards 7, 8 and are thereby held in the support structure 6. The mechanical force used to clamp the energy storage cells 1-$i$ and the contact elements 4, 5 can preferably be achieved by a predefined mechanical bias. In one possible embodiment, the two printed circuit boards 7, 8 can be held in the biased position relative to the energy storage cells by a suitable mechanical connection, e.g., by screws or adhesion. As illustrated in FIG. 2, the energy storage cells located on the support structure 6 are electrically and thermally connected at their two poles to the two printed circuit boards 7, 8 via the flat contact elements. The layers 7-1, 8-1 of the two printed circuit boards 7, 8 are provided for conducting current between the individual energy storage cells 1-$i$ in the energy storage composite. The base material of the printed circuit boards 7, 8 consists of a material having a high thermal conductivity similar or comparable to the thermal conductivity of metal. If the base material of the two printed circuit boards 7, 8 is electrically conductive, the printed circuit board has an electrically insulating intermediate layer 7-3, 8-3, as illustrated in the exemplified embodiment of FIG. 2. The heat can be conducted with low thermal resistivity via the contact element and the two printed circuit boards 7, 8 from the interior of the energy storage cells 1-$i$ via the different layers of the printed circuit boards 7-8 and output to the outside surrounding area or a cooling medium, e.g., air or water. The end-side heat flow $Q^{\bullet}_s$ is preferably discharged at the end surfaces of the energy storage cells 1-1, 1-2, as illustrated in FIG. 2. As a result, heat is also discharged from the interior or core of the energy storage cells 1-$i$ which means that the temperature gradient between the interior of the energy storage cell and the peripheral surface of the energy storage cell is minimised. Since the temperature gradient is minimised, the different energy storage cells 1-1, 1-2 within the energy store age less unevenly. In addition to the end-side discharge of the heat flow $Q^{\bullet}_s$, preferably a lateral heat discharge from the energy storage cells 1-$i$ via the peripheral surface thereof to the thermally conductive support structure 6 additionally occurs, as indicated as heat flow $Q^{\bullet}_m$ in FIG. 2.

Therefore, in the arrangement in accordance with the invention, on the one hand there is an end-side heat discharge $Q^{\bullet}_s$ via the thermally conductive contact elements 4, 5, and also a heat discharge via the peripheral surfaces of the energy storage cells 1-$i$ into the support structure 6 as heat flow $Q^{\bullet}_m$. In total, the amount of discharged heat is hereby increased owing to the two different heat flows $Q^{\bullet}_s$, $Q^{\bullet}_m$. This causes the energy storage cells within the energy store to be cooled more efficiently. As a result, the packing density of the energy storage cells 1-$i$ within an electrical energy store can also be considerably increased. The contact surfaces at the end sides of the energy storage cells 1-$i$ can, in one possible embodiment, correspond to the entire surface of the end side of the respective energy storage cell 1-$i$, which means that the contact surface is large both for the electrical current I and also for the heat flow $Q^{\bullet}_s$ and the corresponding electrical thermal resistance is low.

In one possible embodiment of the device in accordance with the invention, the two outer layers 7-2, 8-2 of the two printed circuit boards 7, 8 are substantially thicker than the two remaining layers of the respective printed circuit boards 7, 8. In one possible embodiment, the outer layers 7-2, 8-2 of the two printed circuit boards 7, 8 have a thickness of at least 1 mm. In one possible embodiment, this allows recesses or grooves to be provided in each of the outer surfaces of the outer layers 7-2, 8-2 in order to increase outer surface area of the two printed circuit boards 7, 8. The provided profiling can have the effect of cooling ribs. The thermal resistivity of the two thermally conductive layers 8-2, 7-2 is hereby reduced which means that the heat flow $Q^{\bullet}_s$ increases and therefore more heat can be discharged from the energy storage cells 1-$i$.

In a further possible embodiment, cooling channels can also be provided in the thermally conductive layers 7-2, 8-2, through which a cooling medium flows for additional cooling purposes, which means that the thermal resistivity of the two layers 7-2, 8-2 is additionally reduced.

As can be seen in FIG. 2, the electrical current I is separated from the end-side heat flow $Q^{\bullet}_s$ by the printed circuit boards by means of the electrically and thermally conductive layer 7-1 or 8-1, wherein the electrical current I is laterally discharged to an electrical contact. Electrical safety elements 9-1, 9-2 are provided in each case on one of the two electrically and thermally conductive layers 7-1 or 8-1 of the two printed circuit boards 7, 8, as illustrated in FIG. 2. In one possible embodiment, electrical safety elements are provided only on one of the two printed circuit boards 7, 8, as is the case in the exemplified embodiment illustrated in FIG. 2. In a further possible embodiment, electrical safety elements can also be provided on the lower printed circuit board 8 of the electrically and thermally conductive layer 8-1. The electrical safety elements 9-1, 9-2 consist, for example, of thin bond wires, a safety fuse, a PTC element, a semiconductor element, or some other electrical protection against overloads. The electrical safety elements 9-i can be optionally provided. In one possible embodiment, a dedicated safety element is provided for each energy storage cell 1-i of the energy store. Alternatively, the safety elements 9-i can also be provided for a group of energy storage cells, e.g., a group of energy storage cells connected in parallel. The safety elements 9-i can consist, for example, of PTC elements. These disconnect the electrical connection in the event of an overload. A further possibility is protecting the energy storage cells 1-i against excessive electrical currents I by means of thin bond wires. These wires melt in the event of an excessive current and thus release the electrical contacting of the respective energy storage cell within the energy storage composite in this emergency case. Furthermore, the electrical safety elements can be formed by SMDs which are soldered to the electrically and thermally conductive layer 7-1 of the printed circuit board 7. Furthermore, the electrical safety element can also be formed by an etched-in current bar provided on the layer 7-1. This is considerably heated in the event of an excessive current load which results in the material melting and the electrical contact being interrupted. This process is irreversible, comparable to a commercially available safety fuse.

In the embodiment illustrated in FIG. 2, the energy store comprises a composite of energy storage cells 1-i, wherein the electrical connection of the energy storage cells 1-i to each other is established via a printed circuit board which comprises at least one electrically conductive layer and at least one non-conducting layer. In a further embodiment, the electrical connection of the energy storage cells 1-i to each other is established via connection elements formed of metal which are in contact with the contact elements or connecting elements which consist of an elastic contacting material.

In the embodiment illustrated in FIG. 2, in one variant the printed circuit boards can comprise tapered sections in the printed circuit board tracks thereof. These tapered sections are destroyed at a certain current flowing through the respective tapered section which means that the electrical contact is interrupted.

One advantage of using elastic contact elements or connecting elements is that the elastic contacting material thereof damps mechanical vibrations introduced into the energy storage system from the outside and the individual energy storage cells are subjected to lower accelerations.

In the embodiment illustrated in FIG. 2, the two poles 2-i, 3-i of the energy storage cell 1-i are opposite one another. In another embodiment, the two poles 2-i, 3-i of the energy storage cell 1-i can be located on one side.

Figure 3:
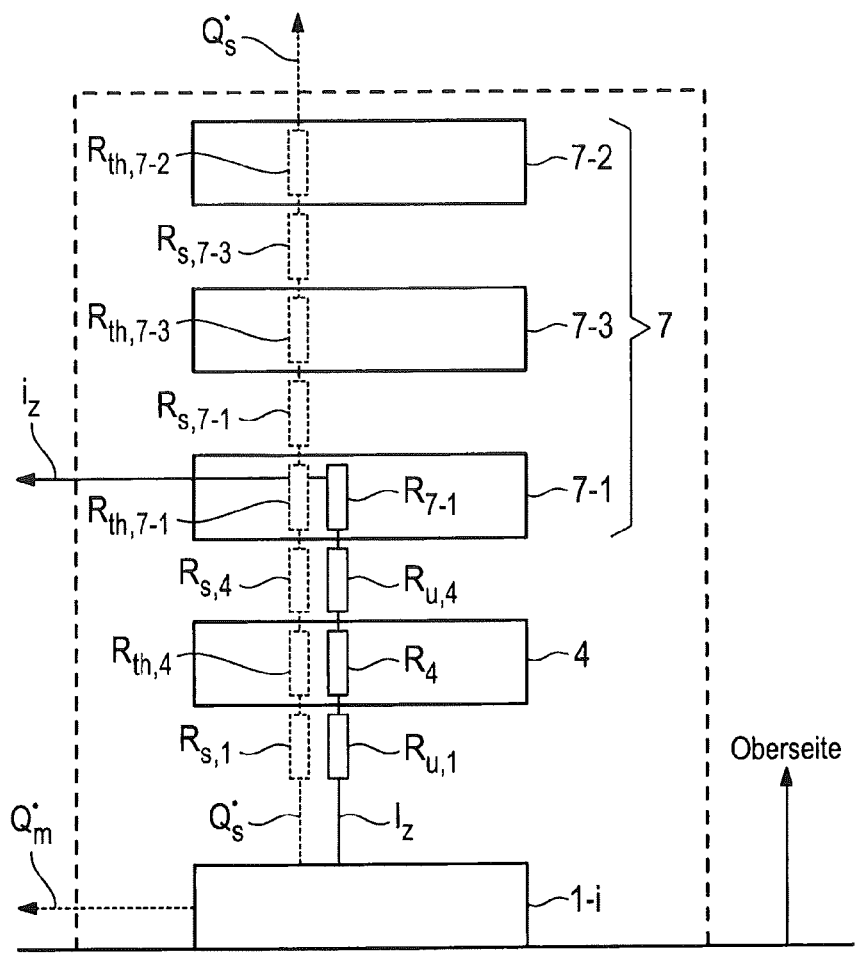
FIG. 3 shows a schematic diagram for explaining the mode of operation of the device in accordance with the invention.

FIG. 3 shows an electrical and thermal equivalent circuit diagram for illustrating an electrical current flow and a thermal heat flow starting from an energy storage cell 1-i to the surrounding area. The heat flow $Q^{\bullet}_m$ is discharged, as illustrated in FIG. 3, via the peripheral surface of the energy storage cell 1-i. The heat flow $Q^{\bullet}_s$ is discharged to the surrounding area via the end surface of the energy storage cell 1-i via the thermally conductive contact element 4 and the thermally conductive layers 7-1, 7-3, 7-2 of the upper printed circuit board 7. In the example illustrated in FIG. 3, $R_s$ is a thermal transfer resistance and $R_u$ is an electrical transfer resistance and $R_{th}$ represents the thermal resistance of the contact element 4 or of a layer 7-1, 7-2, 7-3 of the upper printed circuit board 7. As can be seen in FIG. 3, electrical current I of the energy storage cell is discharged from the electrically and thermally conductive layer 7-1 of the upper printed circuit board 7 and at that location is separated from the heat flow $Q^{\bullet}_s$. By means of the arrangement in accordance with the invention, the heat flow $Q^{\bullet}_m$, which flows from the electrical storage cell 1-i via the peripheral surface thereof or the end surface thereof, is maximised at a predetermined electrical current from the cell in order to keep the thermal load of the respective energy storage cell 1-i as low as possible. As can be seen in FIG. 3, the heat flow $Q^{\bullet}$ is discharged in the arrangement in accordance with the invention either via the peripheral surface M or via the end surface S or via both of them, i.e., the peripheral surface and the end surface. The sum of the thermal transfer resistances $R_s$ and the thermal resistances $R_{th}$ is preferably minimised to maximise the heat flow. The major portion of the thermal energy is produced in the interior of the energy storage cell 1-i. The heat can be guided more efficiently from the interior of the energy storage cell 1-i to the outside by way of the heat dissipation via the end surfaces or poles of the energy storage cells 1-i, when the sum of the thermal resistances is lower, i.e., the sum of the thermal resistances from the interior to the pole or the end surface of the energy storage cell is lower than the thermal resistance from the interior of the energy storage cell to the peripheral surface thereof.

FIGS. 7A, 7B, 7C show different design variations of energy storage cells 1-i. FIG. 7A shows a cylindrical energy storage cell 1-i having two opposite poles 2-i, 3-i. FIG. 7B shows a prismatic or cuboid energy storage cell 1-i having two poles 2-i, 3-i on one end surface. FIG. 7C shows an energy storage cell 1-i in the form of a slot or pouch which is relatively flat and has the poles 2-i, 3-i at one end side.

The connecting or contact elements 4-i, 5-i can also be used for connecting and linking two current-carrying conductors, wherein currents having a current density of more than 0.05 A/mm$^2$ can be transferred. Therefore, a connecting element is also suitable for transferring large electrical powers, e.g., also in a plug system or lustre terminal. The invention thus also provides a connecting system for connecting two electrical conductors, wherein an electrically conductive elastomer is located between the two electrical conductors. The two electrical conductors can consist of different materials, e.g., of a copper or aluminium alloy.

Figure 4:
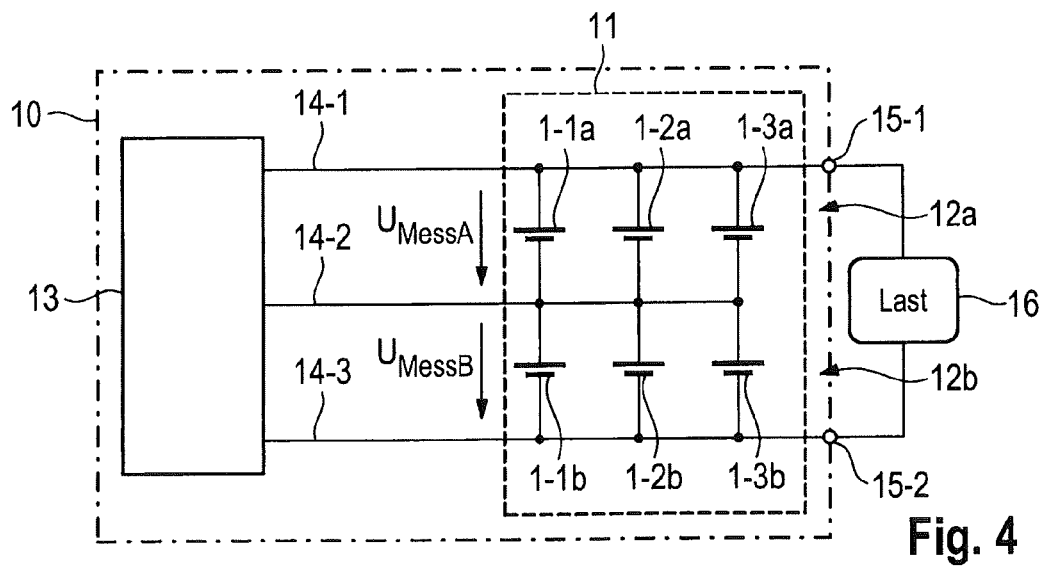
FIG. 4 shows a circuit diagram for explaining one possible exemplified embodiment of an energy storage device in accordance with the invention.

FIG. 4 shows an exemplified embodiment of an energy storage device 10 in accordance with the invention which contains an energy store 11. The energy store 11 consists of a plurality of series-connected energy storage cell groups 12 A, 12 B which each consist of a plurality of energy storage cells 1-i connected in parallel. The energy storage cell groups 12A, 12B each comprises three energy storage cells 1-i connected in parallel, as illustrated in FIG. 4. Therefore, the first energy storage cell group 12A comprises energy storage cells 1-1a, 1-2a, 1-3a connected in parallel and the second energy storage cell group 12B comprises energy storage cells 1-1b, 1-2b, 1-3b connected in parallel. The number of energy storage cells 1-i connected in parallel within an energy storage cell group can vary. An energy storage cell group can include more than two energy storage cells. Furthermore, the number of series-connected energy storage cell groups 12A, 12B can vary, wherein, for example, more than two energy storage cell groups can be series-connected one after the other. The poles of the energy storage cells 1-i are each connected to a printed circuit board 7, 8 via an electrically and thermally conductive contact element, which printed circuit board is provided to separate an electrical current I, received by the respective energy storage cell 1-i via the contact element, from a heat flow $Q^{\cdot}$ received via the contact element. The energy storage cell groups 12A, 12B, connected in parallel, of the energy store 11 are each connected to an electronic monitoring unit 13 via sense lines which are provided on the printed circuit board. In the simple exemplified embodiment illustrated in FIG. 4, two energy storage cell groups 12A, 12B of the energy store 11 are connected to the electronic monitoring unit 13 via three sense lines 14-1, 14-2, 14-3, which monitoring unit is a battery management system BMS. The number of sense lines 14-i corresponds to the number of series-connected energy storage cell groups plus 1. The sense lines 14-i extend within the printed circuit boards 7, 8, between which energy storage cells 1-i of an energy storage cell group are clamped. Owing to the progression of the sense lines within the printed circuit boards 7, 8, it is not required to provide separate contacting of the sense lines 14-i with the energy storage cells and guiding of corresponding sense cables. As a result, the costs of manufacturing the energy storage device 10, as illustrated in FIG. 4, can be considerably reduced. Guiding the sense lines 14-i within the printed circuit boards 7, 8 can be ensured by way of a corresponding design in the printed circuit board layout. By virtue of the fact that the cell contacting occurs on a printed circuit board, the sense lines can be simply included in the printed circuit board layout. This means that contacting of sense or sensor lines is not required and the sensor line 14-i can be guided directly to the electrical monitoring unit 13 via the printed circuit board 7, 8. The same is also true of the sensor lines such as, for example, for lines from temperature sensors.

The electrical energy storage device 10 comprises connection terminals 15-1, 15-2 for connecting an electrical load 16. The load 16 can be, for example, an electric motor or an inverter of a vehicle. A dedicated electrical safety element for overload protection can be provided e.g., in the first layer of the printed circuit boards 7, 8 for each energy storage cell 1-i of the energy storage device 10. As a result, further hazardous processes which can ultimately result in a cell catching fire, which occurs when an energy storage cell is defective, can be reliably prevented. For example, an internal short-circuit within an energy storage cell results in the electrical safety element interrupting the flow of current which means that energy storage cells, connected in parallel, are reliably prevented from being short-circuited via the defective energy storage cell. As a result, a chain reaction is prevented which could even result in a fire in the energy storage device. In addition, the functional capability of the energy store is preserved.

Contacting and dividing the energy storage cells 1-i into parallel and serial strings within the energy store 11 occurs by means of the printed circuit boards 7, 8 which are also used as a housing and additionally as cooling elements. A safety element can be provided individually for each energy storage cell 1-i on the contacting printed circuit board, which safety element is used as of type of electrical protection for each individual energy storage cell 1-i. If a malfunction occurs in an energy storage cell 1-i, e.g., an electrical short-circuit, then this safety element is triggered and switches off the energy storage cell in question. As a result, the energy storage device 10, e.g., a battery module, always remains in a safe operating state.

The electronic monitoring unit 13 can additionally continuously monitor, via the sense lines, voltages of the energy storage cells 1-i, connected in parallel, of an energy storage cell group 12A, 12B and can detect the failure of an energy storage cell, e.g., caused by an internal short-circuit, using a sudden drop in voltage at the sense line 14-i and can react accordingly.

In one possible embodiment, switching elements are additionally provided in the energy store 11 which are switched by the electronic monitoring unit 13 in response to detected malfunctions. In this embodiment, in addition to the electrical safety elements 9-i, switches can be switched so that the defective energy storage cells 1-i are deactivated as soon as they become defective.

In one possible embodiment, the heat output by the energy storage cells or an energy storage cell group of the energy store 12 is detected by at least one associated temperature sensor. The temperature sensor can likewise be provided on the printed circuit boards 7, 8. The temperature sensor signals the detected temperature of the respective energy storage cell or energy storage cell group to the electronic monitoring unit 13. Since the heat of the energy storage cells 1-i is dissipated via the poles in the arrangement in accordance with the invention, these temperature sensors can be provided in the contacting PCB or printed circuit board and do not need to be accommodated in the interior of the battery module or energy store. As a result, the manufacturing costs are additionally reduced.

In a further possible embodiment of the energy storage device 10 in accordance with the invention, compensation resistors can additionally be provided to convert excess charge of the energy storage cells 1-i of the energy store 11 into heat. The compensation resistors output the heat produced thereby to the printed circuit boards 7, 8 and are controlled via the monitoring unit 13. The compensation resistors are provided for compensating or balancing the individual energy storage cells with regard to different electrical charges. The load differences and different ageing of the energy storage cells 1-i can cause, within the energy store 11, the series-connected energy storage cells 1-i to have different losses. As a result, the electrical charge, which may be provided for the individual series-connected cells, varies. The charge differences are compensated for by means of so-called balancing using compensation resistors. Excess charge from individual energy storage cells 1-i is converted into heat via compensation resistors. Since, in the case of conventional energy stores, the heat dissipation can occur only in a very limited manner, it may be the case that in conventional energy stores the balancing or compensating procedure does not satisfy the instantaneous load of the energy store and as a result the power output or power input has to be restricted.

In the case of the energy store 11 in accordance with the invention, the monitoring unit is preferably mounted directly on the energy store 11. The heat of the compensation resistors can thus be output simply to the contacting PCB or printed circuit board 7, 8. As a result, the balancing output in the energy storage device 10 in accordance with the invention is considerably increased and thus has no influence of the electrical load dynamics of the energy storage device 10.

The heat output by the compensation resistors is preferably uniformly distributed via the printed circuit boards 7, 8 consisting of thermally conductive layers in order to pre-heat the energy store 11. Pre-heating preferably occurs at low ambient temperatures. At low ambient temperatures, the extractable power and energy of the energy storage cells 1-i decreases. Therefore, in this preferred embodiment, at low temperatures the energy store 11 is pre-heated. In contrast to conventional energy stores in which the energy stores are pre-heated by a dedicated heater, in the energy store 11 in accordance with the invention pre-heating occurs by means of the compensation resistors which are provided for the charge compensation. Since the temperature distribution on the contacting PCBs or printed circuit boards 7, 8 is extremely effective, the generated heat of the balancing or compensation resistors is effectively distributed to all the energy storage cells 1-i of the energy store 11. Therefore, the energy store 11 is automatically pre-heated, in particular at low ambient temperatures, whereby the extractable power and energy of the energy storage cells 1-i is increased.

Figure 5B:
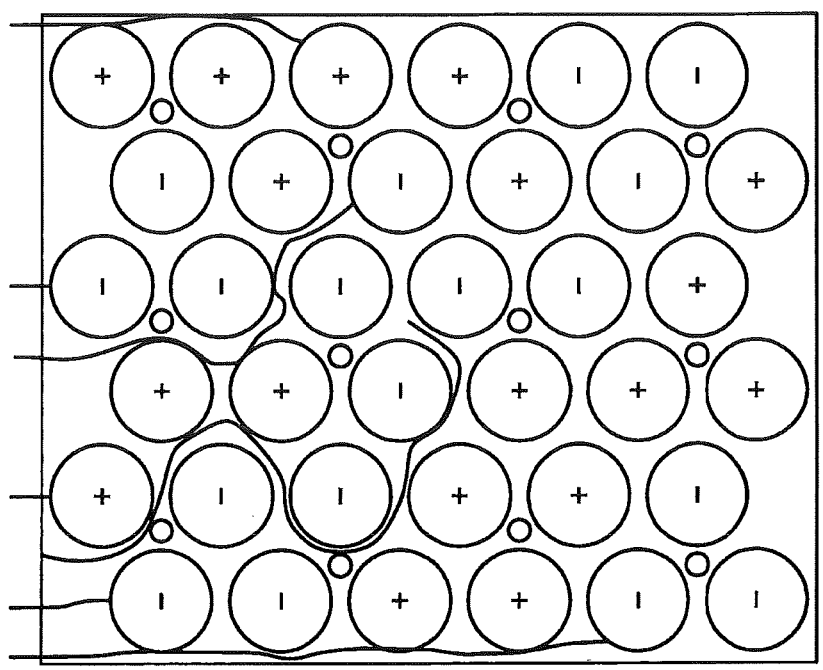
FIGS. 5A, 5B show pole arrangements on a printed circuit board in an embodiment of the energy storage device in accordance with the invention.
Figure 5A:
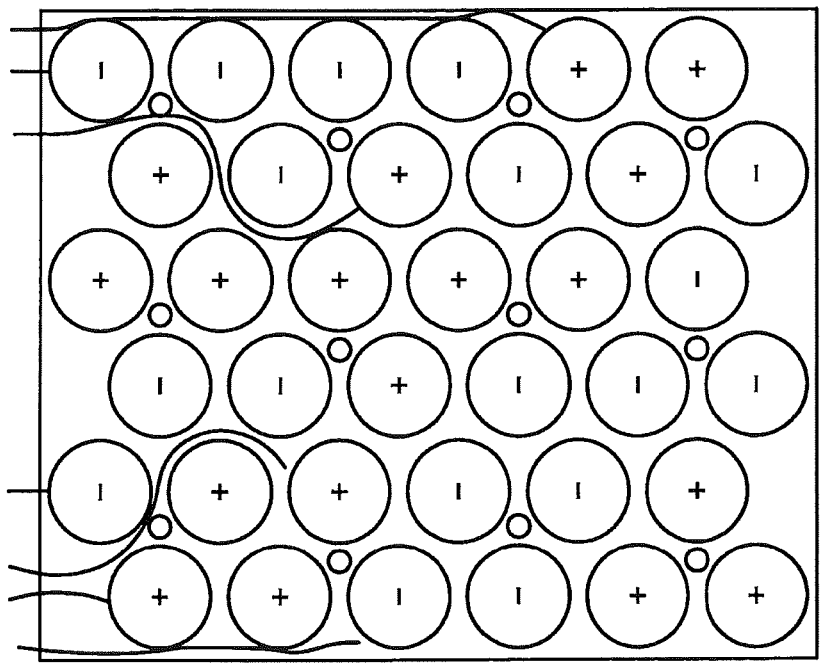

FIGS. 5A, 5B show a possible pole arrangement on a printed circuit board which can be used in the device or energy storage device in accordance with the invention.

FIG. 5A shows, by way of example, the pole arrangement of an upper printed circuit board 7 on the side facing the energy storage cells 1-i.

FIG. 5B shows a corresponding pole arrangement on the lower printed circuit board 8 on the side facing the energy storage cells 1-i.

By way of a suitable pole arrangement, a uniform heat distribution can be assisted in the possibly provided parallel circuits and between the printed circuit boards 7, 8.

Figure 6A:
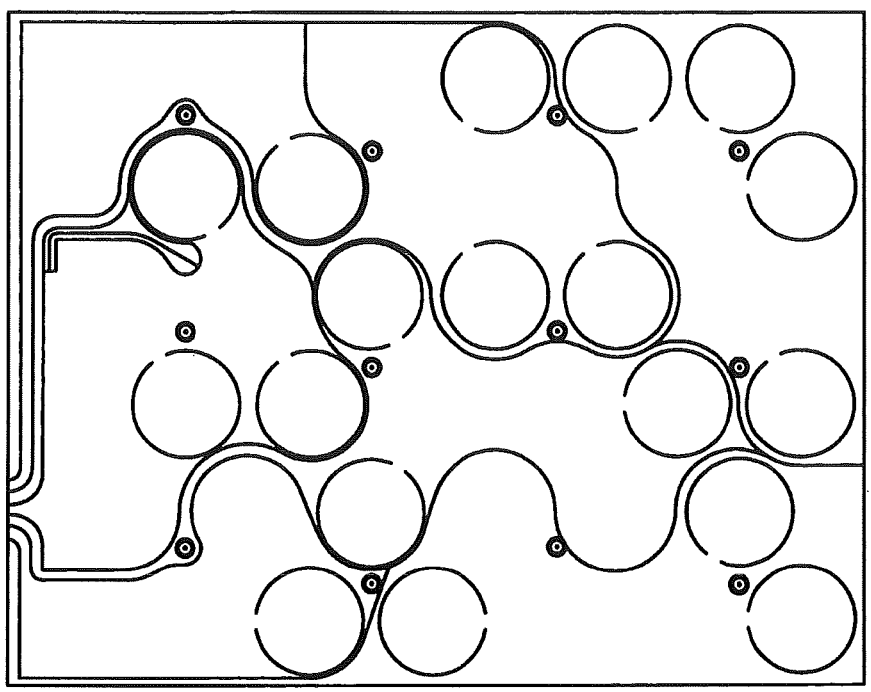
FIGS. 6A, 6B show one possible printed circuit board layout in an embodiment of the energy storage device in accordance with the invention.
Figure 6B:
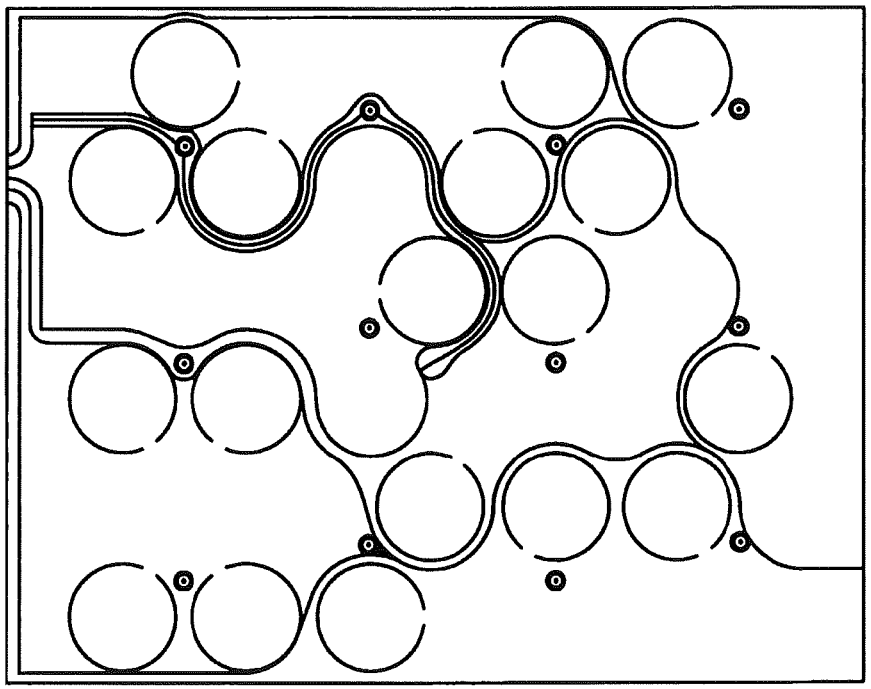

FIGS. 6A, 6B show a possible printed circuit board layout for the pole arrangement having sense or sensor lines integrated therein for connection to the electronic monitoring unit 13 and for connection of temperature sensors. In addition, bores for screws for assembling the electrical energy store 11 are illustrated.

The contacting device in accordance with the invention can be used to achieve an optimum, long service life for the energy store 11 and a high level of efficiency when using the energy store 11. Using the device in accordance with the invention, it is possible to keep the temperature of the entire energy store 11 in an optimum temperature range and to minimise the temperature gradients within the energy storage cells 1-i.

The device in accordance with the invention permits a thermal connection of energy storage cells or battery cells in an energy storage composite, wherein a heat flow and an electrical current are conducted to the outside from the energy storage cells 1-i via electrically conductive contact surfaces of the battery cells. The energy storage cells 1-i are protected against electrical overloads by means of safety elements, via which a heat flow does not occur. Heat is diverted from the interior of the energy storage cell 1-i via the pole of the energy storage cell. Furthermore, heat can be diverted from the external skin or periphery of the energy storage cell 1-i. Efficient cooling is achieved hereby, wherein in addition a low temperature gradient from the interior to the exterior of the energy storage cell 1-i is achieved. One advantage of the contacting device in accordance with the invention is that it provides a large contacting surface area and the electrical and thermal resistance is reduced. The flexibility of the contact elements serves to damp mechanical vibrations. In addition, material irregularities can be compensated for and the assembly process is simplified. This is particularly important when the electrical energy storage device 10 in accordance with the invention is provided within a vehicle. This form of contacting, in contrast to a rigid contacting connection, also cannot be damaged by vibrations.

In one possible embodiment, the electrical monitoring unit 13 can signal, by means of the sense lines 14-i, the occurring malfunction or the defective energy storage cell 1-i to a higher software layer or to a driver. The arrangement or contacting device in accordance with the invention is a solder-free and weld-free contacting concept for multifunctional printed circuit boards which means that manufacturing costs when producing energy stores 11 are significantly reduced. The elastic contact elements are connected to the printed circuit boards 7, 8 in a sandwich-like and surface-coherent manner. Current can be conducted and heat can be transported away via the different layers of the printed circuit boards 7, 8. In an advantageous manner, this material composite also contributes to improved statics of the energy storage cell pack and has a positive effect on the packing density.

By using the contacting device in accordance with the invention, it is possible to dispense with a complex interconnection of many comparatively small energy storage cells to form energy storage composites, which has an advantageous effect on the fire safety of the energy store and thus of the corresponding electric vehicle in particular owing to the low discharge currents in the case of smaller energy storage cells. The electrical losses are kept low and in addition the temperature of the energy store 11 is kept in an ideal temperature working range owing to the increased service life and the higher degree of efficiency of the electrical energy store 11 in accordance with the invention. The contact surfaces at the negative and positive poles of the energy storage cell 1-i ensure an efficient diversion of heat and allow a low-loss electrical and thermal energy transfer. An electric motor of a vehicle can be connected to the energy store 11, the cruising range of the vehicle being high owing to the high level of efficiency of the energy store 11.

The energy storage device 10 in accordance with the invention can be installed in different vehicles or portable devices. The energy storage device 10 in accordance with the invention can also be used, for example, as an energy source for a portable device, in particular for a portable computer or mobile terminal, in particular for a mobile telephone or the like.

In one possible embodiment of the energy storage device 10 in accordance with the invention, the energy storage device 10 is configured in a modular manner which means that in this embodiment different energy storage cell groups 12A, 12B of energy storage cells, connected in parallel, can be assembled together in a modular manner. Furthermore, in one possible embodiment, mechanical connections to the printed circuit boards 7, 8 can be provided and can allow such a modular assembly of the energy storage cell groups 12A, 12B.

The invention claimed is:

1. A device for contacting one or more electrical energy storage cells of an energy store, each storage cells including a pair of poles for connection to a printed circuit board, comprising:
   an electrically and thermally conductive contact element provided on the contact surfaces of each of said pair poles of each of the one or more electrical energy storage cells,
   one or more printed circuit boards connected to each of said pair of poles of each of the one or more electrical energy storage cells and provided to separate an electrical current, flowing from the respective energy storage cell via the contact element, from a heat flow received via the contact element, wherein the contact element is elastically deformable from a change in a longitudinal extension in a direction perpendicular to the contact surfaces of the poles, wherein the contact element for each pole is a flat contact element including an elastic material between the respective pole of the electrical energy storage cell and the one or more printed circuit boards, and further wherein the elastic material is an elastic contacting material which includes a mixture of elastomer and metal particles configured to electrically and thermally connect two electrical conductors consisting of different materials without these electrical conductors touching, wherein the contact surface of the pole is completely or partially protected against being contacted by moisture.

2. The device as claimed in claim 1, wherein the electrical energy storage cells are clamped at their two poles between two printed circuit boards.

3. The device as claimed in claim 1, wherein the one or more printed circuit boards each include an electrically conductive and heat-conducting first layer which lies against a corresponding contact element, wherein the first layer laterally discharges the electrical current flowing via the contact element and transfers the heat flow flowing via the contact element to a second heat-conducting layer of the one or more printed circuit boards which outputs the heat flow received by the first layer to a surrounding area or to a cooling medium.

4. The device as claimed in claim 1, wherein the first layer is further configured to permit lateral heat dissipation owing to a suitable pole arrangement.

5. The device as claim 1, wherein the second layer is electrically conductive and is separated from the first layer by an electrically insulating intermediate layer of the one or more printed circuit boards, wherein the electrically insulating intermediate layer includes a thermally conductive material.

6. The device as claimed in claim 1, further comprising electrical safety elements or tapered sections for overload protection provided in or on the first layer of the one or more printed circuit boards.

7. The device as claimed in claim 1, in which the electrical energy store includes a plurality of energy storage cells with poles including the electrically and thermally conductive contact element, which plurality of energy storage cells are connected in parallel in an energy storage cell group, wherein a plurality of energy storage cell groups each including energy storage cells connected in parallel are series-connected in the energy store, and wherein the energy storage cells include chemical or physical storage systems.

8. The device as claimed in claim 7, wherein the series-connected energy storage cell groups of the energy store are connected to an electronic monitoring unit in each case via sense lines which are provided in the one or more printed circuit boards, wherein the monitoring unit is configured to monitor an electrical voltage applied at each energy storage cell group of the energy store.

9. The device as claimed in claim 7, further comprising an electrical safety element for current limitation provided in or on said first layer for a corresponding one of the one or more printed circuit boards for each energy storage cell group or for each individual energy storage cell of an energy storage cell group.

10. The device as claimed in claim 8, further comprising at least one temperature sensor associated with each energy storage cell or each energy storage cell group configured to detect the heat output by the associated energy storage cell or by the associated energy storage cell group of the energy store, wherein the at least one associated temperature sensor is provided on one of the one or more printed circuit boards, the at least one temperature sensor configured to transmit a signal indicative of the detected temperature to the electronic monitoring unit of the energy store via sense lines on the one or more printed circuit boards.

11. The device as claimed in claim 10, wherein the sense lines for the electronic monitoring unit and for the at least one temperature sensor are guided in one and the same one or said one or more printed circuit boards.

12. The device as claimed in claim 1, further comprising compensation resistors configured for converting excess charge from energy storage cells of the energy store into heat, whereby the heat produced thereby is output to the one or more printed circuit boards via the electrically and thermally conductive contact elements, wherein the heat output by the compensation resistors is uniformly distributed via thermally conductive layers included in the one or more printed circuit boards, in order to pre-heat the energy store.

13. The device as claimed in claim 9, further comprising at least one temperature sensor associated with each energy storage cell or each energy storage cell group configured to detect the heat output by the associated energy storage cell or by the associated energy storage cell group of the energy store, wherein the at least one associated temperature sensor is provided on one of the one or more printed circuit boards, the at least one temperature sensor configured to transmit a signal indicative of the detected temperature to the electronic monitoring unit of the energy store via sense lines on the one or more printed circuit boards.

14. The device as claimed in claim 9, wherein the sense lines for the electronic monitoring unit and for the at least one temperature sensor are guided in one and the same one or said one or more printed circuit boards.

* * * * *

UNITED STATES PATENT AND TRADEMARK OFFICE
CERTIFICATE OF CORRECTION

PATENT NO. : 9,559,394 B2
APPLICATION NO. : 14/417157
DATED : January 31, 2017
INVENTOR(S) : Richard Eckl et al.

Page 1 of 1

It is certified that error appears in the above-identified patent and that said Letters Patent is hereby corrected as shown below:

On the Title Page

Item (73):
The Assignee should be corrected to INVENOX GMBH.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*